April 19, 1966  T. KLOENDER  3,246,365
APPARATUS FOR HOT EMBOSSING CONTINUOUS WEBS
Filed March 1, 1963  2 Sheets-Sheet 1

INVENTOR
THEODOR KLOENDER
by Jacob L. Kollin
ATTORNEY

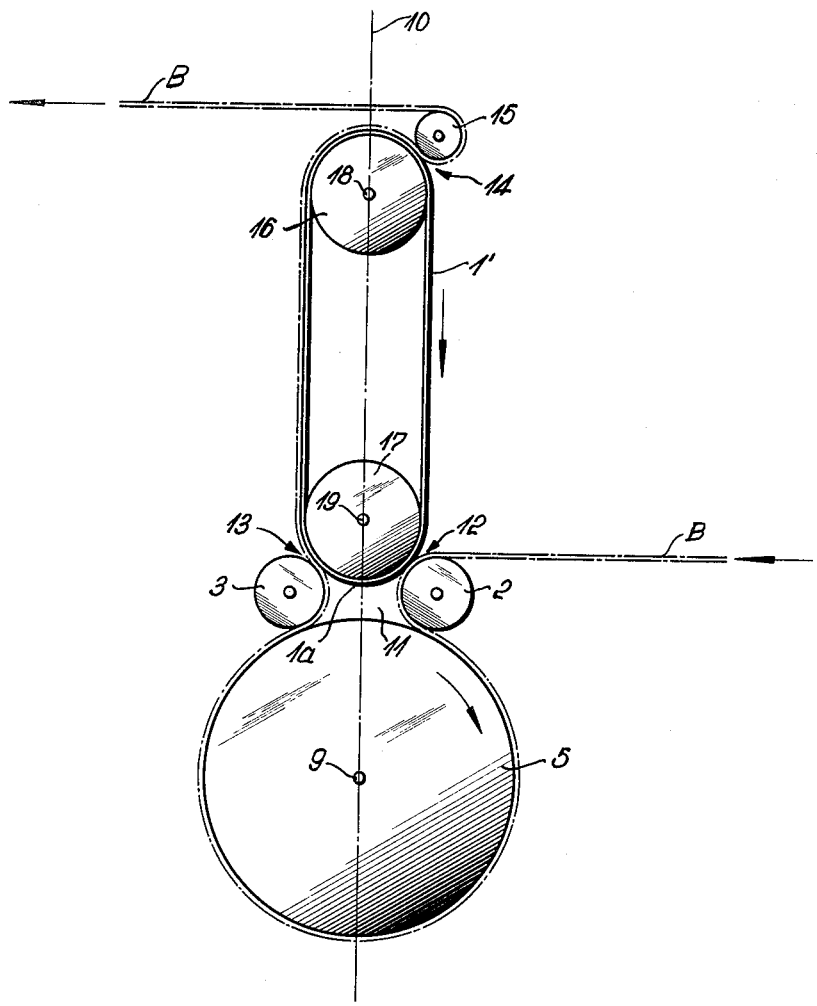

United States Patent Office 3,246,365
Patented Apr. 19, 1966

3,246,365
APPARATUS FOR HOT EMBOSSING
CONTINUOUS WEBS
Theodor Kloender, Krefeld, Germany, assignor to Paul
Dornbusch, trading as the firm Dornbusch & Co.,
Krefeld, Germany
Filed Mar. 1, 1963, Ser. No. 262,061
Claims priority, application Germany, Mar. 2, 1962,
D 38,278
6 Claims. (Cl. 18—10)

The present invention concerns an apparatus for hot embossing fabric webs, which are preferably thermoplastics material foils, the fabric web to be embossed being regularly conducted over an embossing surface after passing a heating section.

In a known method it is usual to allow, the fabric web to pass over a maximum peripheral sector of a heating drum jacket so as to plasticise it extensively. In this state of the web, as known, a comparatively light pressure suffices to obtain a clean and clear impression of the embossing pattern in the fabric web, so long as the fabric web is fed to the embossing surface practically tension free and having set to such an extent at the removal point from the embossing surface, to prevent it becoming distorted afterwards.

The embossing pressure is usually produced by a driven embossing roller acting as an embossing surface, which rotates at a peripheral speed corresponding to the passage speed of the fabric web, the embossing roller co-operating with a counter roller, the operational pressure of which is regulated by adjusting the distance between the two axes of rotation.

In hot embossing devices operating with metal embossing rollers it has been found necessary by experience for line pressures to be applied, in the order of magnitude of 100 to 150 kg./cm.$^2$ and over, to produce satisfactory embossings in the fabric web passing between embossing and counter rollers. These line pressures amount to a multiple of the pressures theoretically required for deforming the plasticised fabric web, because the greater proportion of embossing pressure to be applied in practice is wasted on the useless deformation of the counter roller jacket made of rubber or the like elastically yielding materials.

Numerous proposals have been made to avoid the above mentioned high pressures which necessitate a correspondingly solid construction of all apparatus components subjected to the load thereof, more especially the embossing roller itself. According to one known proposal the fabric web to be embossed is led over an air permeable drum jacket provided with an embossing pattern, a vacuum being maintained within this jacket. Even if there were no absolute vacuum prevailing in the interior of the embossing drum, it would be possible only to obtain an embossing pressure to the value of the momentary atmospheric pressure prevailing, thus a specific surface pressure of approximately 1 kg./cm.$^2$ acting on the outer surface of the fabric web, which would not even suffice. for extensively plasticised foils.

It is extremly difficult and costly to machine the required relief profile on the embossing drum jacket so as to produce the embossing pattern in the fabric web; the jacket must necessarily also comprise a porous, air permeable material, or have numerous fine perforations formed therein for the suction effect on the fabric web. Moreover, the fabric web impresses itself in the pores or perforations of the drum jacket and small corresponding raised portions on its embossed side therefore occur.

For all these reasons vacuum embossing has hitherto not been a practical reality, although it operates at a comparatively low pressure, and therefore all the apparatus components subjected to the load of the embossing pressure are of accordingly lighter construction.

An object of the invention is to combine the advantages of conventional excess pressure embossing, namely the production of neat and clear embossings in the fabric web passing through, with those of a vacuum embossing, without however having to endure the inherent disadvantages of the two embossing methods.

According to the present invention, in a method of hot embossing fabric webs, preferably of thermoplastics foils, the fabric web to be embossed is constantly conducted over an embossing surface rotating in the same direction and at the same speed thereof after passing through a heating section, the inner side of the fabric web, supported on the embossing surface, being subjected to a vacuum, whilst the unsupported outer side of the fabric web is subjected only to atmospheric pressure, the fabric web being led, with its inner surface unsupported, directly before ascending the embossing surface, through a closed space partly defined by the embossing surface whilst being subjected to a vacuum and, also at the ascent point of the embossing surface, being expediently pressed against this surface with a compressive force exceeding that of atmospheric pressure.

In this way, the side of the fabric web is subjected to a vacuum even before ascending the embossing surface, which vacuum acts through the embossing surface on the fabric web from the other side. Accordingly, the embossing surface itself need not be constructed so as to be porous nor need it be perforated. Moreover, it is also possible for the high line pressure between embossing roller and counter roller, hitherto necessary in conventional excess pressure embossing, to be completely omitted. Consequently it is possible for all parts of the apparatus necessary for carrying out the method and subjected to load to be of substantially lighter construction and simpler design than in the case of conventional embossing calenders operating at high line pressures.

Also according to the present invention an apparatus for hot embossing fabric webs, preferably of thermoplastics foils, comprises a heating section with a heating drum and an embossing surface rotating in the same direction and at the same speed as the fabric web to be embossed and having the form of a rotating embossing roller or of an endless revolving embossing belt, an arcuate sector of the embossing surface adjacent the heating drum together with the heating drum itself and two laterally arranged guide rollers for the fabric web defining a roller square, the inner space thereof, hermetically sealed in the direction of the end faces of the rollers, being adapted to be connected to a vacuum source and traversed by the fabric web, with its side to be embossed unsupported.

At the point of ascent on the embossing surface, e.g. on the embossing roller jacket, the internal surface of the fabric web is already subjected, in the manner mentioned above, to the action of a vacuum. Hence the fabric web subjected to the influence of the pressure force exerted against its external surface, is urged flush into the relief pattern of the embossing surface.

The two guide rollers of the fabric web are expediently adapted to be adjusted opposite one another with respect to their mutual axle distance and arranged symmetrically relative to a perpendicular plane passing through pivotal axles of the embossing roller and the heating drum. For hermetically sealing the aforesaid internal space against the outer atmosphere it is sufficient for the guide rollers to be loosely supported on the jacket of the heating drum under the influence of their dead weight.

For mutual adjustment of the guide rollers it is advisable for these rollers or bearing pins to be so displaceably arranged in arcuate slot guides that their pivotal axes thus move on an imaginary regular cylinder concentric to the jacket of the heating drum.

The invention will be described further, by way of example, with reference to the accompanying drawings, in which:

FIG. 3 is a schematic view through a similar apparatus, which is equipped with an embossing belt instead of an embossing roller.

Figure 1:
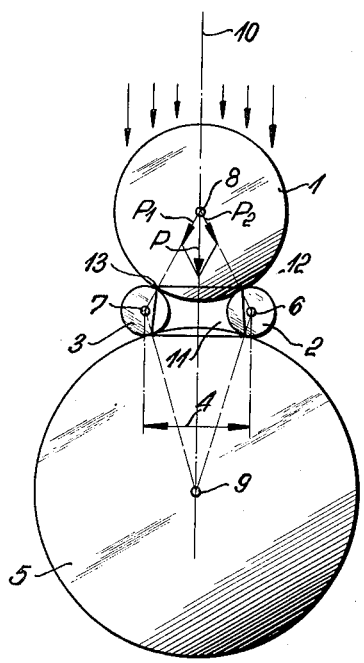
FIG. 1 is a schematic side view of the pressure distribution in a roller square, comprising an embossing roller, two supporting rollers for the embossing roller and a heating drum.

An embossing roller 1 of conventional design, has a jacket provided with a relief profiling adapted to produce the required embossing pattern in a fabric web. The roller 1 is loosely mounted on two supporting rollers 2 and 3 simultaneously acting as guide rollers for the fabric web B (FIG. 2) to be embossed. The supporting rollers 2 and 3, which in turn are loosely supported on the jacket of a heating drum 5, are adapted to be retained in a mutually adjustable axis distance 4 by virtue of the fact that their pivot pins are mounted in bearing members adapted to be mutually adjusted in opposition (not shown). The bearing members are displaceable on an arc of a circle, which passes through pivotal axes 6 and 7 of the supporting rollers 2 and 3 respectively, concentric to the jacket of the heating drum 5. The relative opposed adjustment of the bearing members preferably takes place symmetrically to a perpendicular plane 10, which passes through a pivotal axis 8 of the embossing roller 1 and a pivotal axis 9 of the heating drum 5.

The sector of a circle 1a of the embossing roller jacket disposed between the guide rollers or the supporting rollers 2 and 3, together with these rollers and the heating drum 5 forms a roller square. The latter encloses in the drawing plane, on all sides, an internal space 11, which also to both end faces of the four rollers are each hermetically sealed by means of a cover hood or the like (not shown). When the apparatus is practically operated, the inner space 11 adapted to be connected to a vacuum source (not shown), is exhausted, 96% of the absolute vacuum being obtainable.

As shown in FIG. 1, the embossing roller 1, under the influence of the atmospheric pressure thereon and its dead weight, which engages the pivotal axis 8 in the centre of gravity of the embossing roller and pointing perpendicularly downwards, thus falling in the plane 10, is urged with a force P between the supporting rollers 2 and 3 into the vacuum space 11. At each supporting point 12 and 13 of the embossing roller 1 on the supporting rollers 2 and 3, there is obtained a force component P1, which is directed against the pivotal axis 6 or 7 of the associated supporting roller. The magnitude of the specific surface pressure effective at one supporting point 12 or 13, substantially depends upon the distance of the two supporting points relative to one another and amounts to approx. 10 to 20 kg./cm.$^2$, when based on the average weight of conventional embossing rollers.

Figure 2:
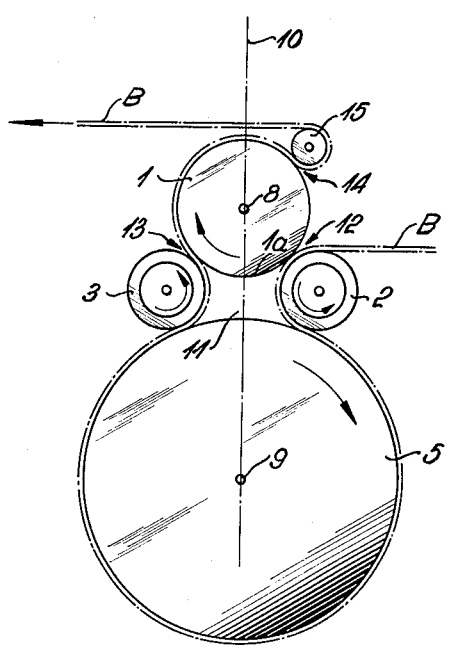
FIG. 2 is a schematic side view showing the passage of the fabric through an apparatus comprising the aforesaid roller square.

As shown in FIG. 2 of the drawings, the fabric web B of thermoplastic material to be embossed is fed to the hot embossing device at the supporting points 12 of the embossing roller 1 on the right supporting roller 2. This causes the fabric web B reach the internal space 11 subjected to a vacuum and on its side remote from the supporting roller 2 is freed of all the small air bubbles etc. adhering to this side. The fabric web B then leaves the space 11 through the gap between the supporting roller 2 and the heating drum 5, with its side freed of air passes over the jacket of the rotating heating drum 5 and returns again into the space 11 through the gap between this drum and the left supporting roller 3. From the supporting roller 3 the fabric web B is fed directly to the jacket of the embossing roller 1 at its supporting point 13 on the supporting roller 3.

As shown in FIG. 2, the fabric web B remains in contact with the internally heated jacket of the drum 5 over a circumferential sector of more than 300 degrees of the arc and by the atmospheric pressure acting against its outer side is thus urged flush against the drum jacket. The good heating effect already caused thereby of the drum 5 is also increased by the circumstance that the inner side of the fabric web B supported against the drum jacket is practically air free in the space 11 and thus there are no longer any small air bubbles impairing the heat transfer on this side of the web.

After the fabric web B has been extensively plasticized due to the action of the heating drum 5, it has lost its mechanical strength, which in most cases is very considerable in the set state, with the exception of a small fraction. Hence the fabric web must not be subjected to any noticeable tensile stresses until it has set again. This requirement is easily fulfilled in the hot embossing device shown. It is necessary only to ensure that the heating drum 5 and the embossing roller 1, owing to their drives being correspondingly constructed, are always rotated at a constant peripheral speed and that the bearing friction of the supporting rollers 2 and 3 in the aforesaid relatively adjustable bearing members is as small as possible. When maintaining these conditions the fabric web B in a plasticized state arrives within the space 11 practically tension-free at the supporting position 13 of the embossing roller 1 on the left supporting roller 3. The aforesaid pressure prevailing at this point causes the air-free side of the fabric web B to be urged with adequate specific surface pressure into the jacket profiling of the embossing roller 1.

On the path of the fabric web B over the jacket of the embossing roller 1, the atmospheric pressure acting against the outer side of the fabric web firmly retains the fabric web in the jacket profiling of the embossing roller. By suitably cooling the embossing roller 1 it is readily possible to ensure that the fabric web B, at its descent point 14 from the embossing roller, has again adequately set. The fabric web on the subsequent journey from the embossing roller to the place of further use, e.g. a winding device, on which it is subjected unavoidably to tensile stresses, can no longer become distorted. If necessary, cooling rollers or the like may be incorporated in the path of the fabric web, and they may expediently be provided directly after the descent point 14. In any case it is possible for the fabric web B to retain the embossing unchanged which it has at the descent position 14 from the embossing roller 1. The guide roller 15 disposed at the descent point 14, as shown in FIG. 2, in the direction of feed of the fabric web B has a comparatively large angle of curvature behind the feed position 13 of this web on the jacket of the embossing roller 1. The guide roller 15 may expediently travel along a bifurcated bearing or the like adapted to be pivotal about the pivotal axis 8 of the embossing roller 1 (not shown), so that the aforesaid angle of curvature as required in an individual case may be adjusted to be larger or smaller.

At its point 12 of entry into the internal space 11 subjected to a vacuum, the fabric web B is subjected to the same specific surface pressure as at its point of feed 13 to the jacket of the embossing roller 1. At the point 12 the fabric web B is however in a set state and has an accordingly high mechanical strength, so that at this point there is no danger of preliminary embossing taking place. Even, however, if at this point a kind of preliminary embossing of the fabric web B fed in a cold state should be produced, this preliminary embossing with the subsequent plasticizing of the foil web on the heating drum 5 would disappear completely. If necessary the feed of the fabric web B to the heating drum over an additional pressure application roller (not shown) may be shifted also to another point on the drum jacket. The embossing roller 1 would then be directly supported on the supporting roller 2.

In the example shown in FIG. 3 the embossing roller is replaced by an endless embossing belt 1′ which, in conventional manner, passes over two guide rollers 16 and 17. The plane 10, relative to which the guide rollers 2 and 3 are symmetrically arranged, herein passes through axes of rotation 18 and 19 of the guide rollers 16 and 17 respectively, and the pivotal axis 9 of the heating drum 5. In a similar manner as the jacket of the embossing roller 1 in the first example, the part section of the embossing belt 1′ momentarily passing over the lower guide roller 17 forms an arcuate sector 1a between the guide rollers 2 and 3, thus between the ascent points 12 and 13 of the fabric web B. This sector together with the rollers 2 and 3 and the heating drum 5 defines the internal space 11 closed on all sides of the roller square transversed by the fabric web B adapted to be connected to a vacuum source.

The delivery point 14 of the fabric web B from the embossing belt 1′ embodied by the guide roller 15 is disposed on the upper guide roller 16 of the embossing belt remote from the heating drum 5. The section of the fabric web B momentarily situated between the points 13 and 14 and supported against the embossing belt 1′ is retained under the influence of atmospheric pressure exerted against its outer side flush and without distortion against the profile pattern of the embossing belt. The unsupported inner side of this section in the internal vacuum space 11 of the roller square 1a, 2, 5, 3 reaches the embossing belt 1′ practically free of air at the ascent point 13. To increase to pressure application at the point 13, the lower guide roller 17 of the embossing belt 1′, may be subjected to additional weight or spring-loading, the embossing belt 1′ being simultaneously constantly tensioned thereby.

I claim:

1. An apparatus for hot embossing a fabric web, comprising a rotatable heating drum, a rotatable embossing surface rotating in the same direction and at the same speed as the fabric web to be embossed, said embossing surface having an arcuate sector adjacent said heating drum, and two laterally arranged guide rollers for the fabric web being mounted between said heating drum and said arcuate sector, said sector, said heating drum and said guide rollers defining an inner space, a hood for hermetically sealing said space, means connecting said space to a vacuum source, said space being traversed by said fabric web, with its side to be embossed, unsupported.

2. An apparatus according to claim 1, wherein said rotatable embossing surface is in the form of an embossing roller.

3. An apparatus according to claim 1, wherein said rotatable embossing surface is formed by an endless belt arranged about two guide rollers.

4. An apparatus according to claim 1, wherein said guide rollers are provided with adjustable bearing means for oppositely adjusting their axes in such a manner that these axes move along an imaginary regular cylinder concentric with the outer periphery of said heating drum.

5. An apparatus for hot embossing a fabric web, comprising a rotatable heating drum, a rotatable embossing roller rotating in the same direction and at the same speed as the fabric web to be embossed, two laterally arranged guide rollers for the fabric web mounted between said heating drum and said embossing roller, said guide rollers carrying said embossing roller, said guide rollers in turn being loosely supported on the jacket of said heating drum and also arranged symmetrically to a perpendicular plane extending through the axes of rotation of said embossing roller and said heating drum, said embossing roller, said heating drum and said guide rollers defining an inner space, a hood for hermetically sealing said space, means connecting said space to a vacuum source, said space being traversed by said fabric web, with its side to be embossed, unsupported.

6. An apparatus for hot embossing a fabric web, comprising a rotatable heating drum, a jacket arranged on said drum, an endless embossing belt arranged about two guide rollers, rotating in the same direction and at the same speed as the fabric web to be embossed, two laterally arranged guide rollers for the fabric web mounted between said heating drum and a sector of said belt arranged over one said belt guide roller nearest said heating drum, said guide rollers for said fabric web in turn being loosely supported on the jacket of said heating drum, the axis of rotation of said heating drum being disposed in a plane extending through the axes of rotation of said endless belt guide rollers, the removal point of said fabric web from said endless belt being arranged at the other said belt guide roller remote from said heating drum, said belt sector, said heating drum and said guide rollers for said fabric web defining an inner space, a hood for hermetically sealing said space in the direction of the end faces of said rollers and means connecting said space to a vacuum source, said space being traversed by said fabric web, with its side to be embossed, unsupported.

References Cited by the Examiner

UNITED STATES PATENTS

| 2,585,915 | 2/1952 | Chavannes | 264—284 |
| 2,681,294 | 6/1954 | Beguin | 117—61 |
| 2,878,521 | 3/1959 | Kenyon | 264—92 |

ROBERT F. WHITE, *Primary Examiner.*

ALEXANDER H. BRODMERKEL, *Examiner.*